United States Patent [19]

Kayanuma et al.

[11] Patent Number: 5,359,364

[45] Date of Patent: Oct. 25, 1994

[54] ELECTRONIC STILL CAMERA HAVING AN OPTICAL SYSTEM FOR TTL DIMMING

[75] Inventors: Yasunobu Kayanuma, Tokyo; Kazunori Ohno, Omiya, both of Japan

[73] Assignee: Fuji Photo Film Co., Ltd., Kanagawa, Japan

[21] Appl. No.: 135,421

[22] Filed: Oct. 12, 1993

Related U.S. Application Data

[63] Continuation of Ser. No. 820,804, Jan. 15, 1992, abandoned.

[30] Foreign Application Priority Data

Jan. 17, 1991 [JP] Japan .................................. 3-003850

[51] Int. Cl.⁵ ............................................ H04N 5/225
[52] U.S. Cl. .................................... 348/343; 348/362; 354/478
[58] Field of Search ............... 348/207, 335, 343, 344, 348/362, 366, 371; 354/478, 479, 481, 483; 358/335; H04N 5/225

[56] References Cited

U.S. PATENT DOCUMENTS

| | | | |
|---|---|---|---|
| 4,237,475 | 12/1980 | Sekiguch et al. | 358/10 |
| 4,774,539 | 9/1988 | Suda et al. | 354/406 |
| 4,814,811 | 3/1989 | Saito et al. | 354/412 |
| 4,823,199 | 4/1989 | Sakakibara et al. | 358/335 |
| 4,823,200 | 4/1989 | Tsunekawa et al. | 358/335 |
| 4,926,247 | 5/1990 | Nagasaki et al. | 358/43 |

*Primary Examiner*—Joseph Mancuso
*Assistant Examiner*—Tuan V. Ho

[57] ABSTRACT

An electronic still camera having an optical system suitable for TTL direct dimming and capable of disposing a dimming sensor at a suitable position in a main body of the camera. A part of a light reflected by a subject and passing through a taking lens during stroboscopic photographing is diverged by a beam splitter provided on the optical axis of the taking lens and caused to fall into a half mirror. The reflected light diverged by this half mirror is led to the dimming sensor 34, and the transmitted light is led to an AE sensor via a focusing lens. With this arrangement, the dimming sensor can be provided in a position other than the vicinity of a taking shutter and the TTL direct dimming can be conducted.

6 Claims, 1 Drawing Sheet

ELECTRONIC STILL CAMERA HAVING AN OPTICAL SYSTEM FOR TTL DIMMING

This application is a continuation of application Ser. No. 07/820,804 filed on Jan. 15, 1992, now abandoned.

BACKGROUND OF THE INVENTION

1. Field of the Invention

This invention relates to an electronic still camera, and more particularly to an optical system suitable for TTL direct dimming in an auto-strobe device of an electronic still camera.

2. Description of the Related Art

The auto-strobe device has such an arrangement that a stroboscope is actually caused to luminesce during stroboscopic photographing, a light reflected by a subject is measured to control the exposure by real time, namely, the light reflected by the subject is photo-electrically transduced by a dimming sensor, electric signals thus photo-electrically transduced are integrated by an integrating circuit, and, when the electric signals thus integrated reach a value corresponding to proper exposure, the luminescence of the stroboscope is stopped.

Heretofore, in the auto-strobe device of a camera using a silver salt film, there has been used one in which a dimming sensor for measuring a light reflected by a film surface such as SPD is provided in a main body of the camera for conducing TTL dimming.

Now, in the electronic still camera, a solid state image sensing device is provided in place of the silver salt film, and further, an optical low-pass filter and the like are provided in front of the solid state image sensing device, for thus presenting such a problem that it is difficult to provide the dimming sensor for TTL direct dimming in the vicinity of a taking shutter.

SUMMARY OF THE INVENTION

The present invention has been developed to obviate the above-described disadvantages and has as its object the provision of an electronic still camera provided with an optical system suitable for TTL direct dimming and capable of disposing a dimming sensor in a suitable position in a main body of the camera.

To achieve the above-described object, according to the present invention, the electronic still is provided camera wherein an auto-strobe device and an automatic exposure control device are provided, a light from the subject is made to focus at the light receiving plane of the solid state image sensing device via a taking lens and the light is photo-electrically transduced by the solid state image sensing device to obtain image signals. The electronic still camera comprises: a beam splitter provided on the optical axis of the taking lens, for diverging at least a part of the light reflected by the subject and passing through the taking lens; and a half mirror for further diverging the reflected light diverged by the beam splitter to lead the reflected light to a dimming sensor of the auto-strobe device and further to lead the reflected light to an AE sensor of the automatic exposure control device via a focusing lens.

According to the present invention, a part of the light reflected by the subject and passing through the taking lens is diverged by the beam splitter provided on the optical axis of the taking lens and caused to fall into the half mirror. The reflected light diverged by this half mirror and the transmitted light are led to the dimming sensor, respectively, and led to the AE sensor via the focusing lens. With this arrangement, the dimming sensor can be provided in a position other than the vicinity of the taking shutter and the TTL direct dimming can be conducted.

BRIEF DESCRIPTION OF THE DRAWING

The exact nature of this invention, as well as other objects and advantages thereof, will be readily apparent from consideration of the following specification relating to the accompanying drawing, wherein.

DESCRIPTION OF THE PREFERRED EMBODIMENTS

Figure 1:
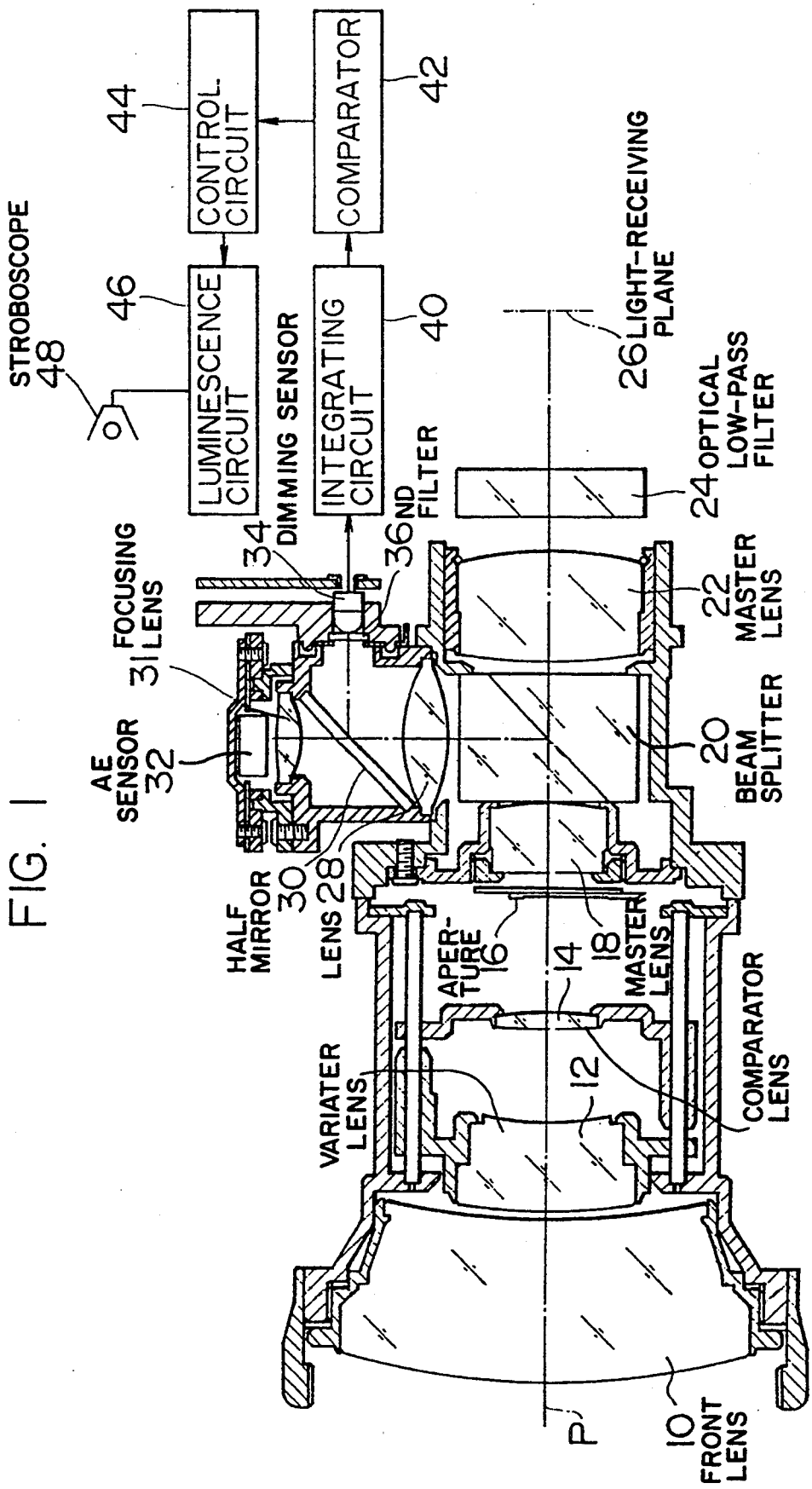
FIG. 1 is a sectional view of the essential portions showing an embodiment of the electronic still camera according to the present invention.

A detailed description will hereunder be given of the preferred embodiments of the electronic still camera according to the present invention with reference to the accompanying drawing.

FIG. 1 is the sectional view of the essential portions showing one embodiment of the electronic still camera according to the present invention. This is the sectional view obtained by taking the electronic still camera having an inner focus type zoom lens along a vertical plane including an optical axis P.

From the front portion on the optical axis P in this camera, there are successively provided a front lens 10, a variater lens 12, a compensator lens 14, an aperture 16, a master lens 18, a beam splitter 20, a master lens 22, an optical low-pass filter 24 in the described order. Incidentally, designated at 26 is a light-receiving plane of the solid state image sensing device such as a CCD, not shown.

The above-described variater lens 12 and compensator lens 14 are provided movably on the optical axis P, respectively. By the movements of these lenses, zooming and focusing are carried out. Namely, during zooming, the variater lens 12 and the compensator lens 14 are moved as held in a predetermined optical relationship, and, during focusing, the compensator lens 14 is moved to a focused position.

Furthermore, the light diverged by the beam splitter 20 is caused to fall into a half mirror 30 via a lens 28. The half mirror 30 has a transmittance and a reflectance (for example, 35% and 65%) corresponding to the sensitivities of an AE sensor 32 and a dimming sensor 34, respectively, the transmitted light is led to the AE sensor 32 via a focusing lens 31, and the reflected light is led to the dimming sensor 34. Incidentally, the lens 28 is an optical system substantially equivalent to the master lens 22, and the focusing lens 31 adjusts the dimensions of an image corresponding to the dimensions of a light receiving portion of the AE sensor 32. Furthermore, the AE sensor 32 is an AE sensor divided into two portions, which include a spot metering light receiving portion for conducting spot metering at the center of a light receiving portion for averaged light measuring. Furthermore, designated at 36 is an ND filter.

An aperture 16 is controlled on the basis of information of the luminance of the subject obtained by the AE sensor 32, and the luminescence of a stroboscope 48 is controlled by the dimming sensor 34 as will be described hereafter. Incidentally, the dimming sensor 34 conducts the center-weighted metering. Furthermore, the dispersion of the dimming sensor 34 can be adjusted by the ND filter 36 and the like and the range of metering can be desirably changed.

Now, when the stroboscopic photographing is performed, the aperture 16 is set according to a guide number, and a luminescence circuit 46 causes the stroboscope 48 to luminesce in synchronism with a shutter release. The light reflected by the subject is passed through the front lens 10, the variater lens 12, the compensator lens 14 and the master lens 18, and is caused to fall into the beam splitter 20, where a part of the light reflected by the subject is diverged and led to the dimming sensor 34 through the lens 28 and the half mirror 30.

The dimming sensor 34 photo-electrically transduces the incident light and outputs electric signals thus photo-electrically transduced into an integrating circuit 40. The integrating circuit 40 integrates the electric signals thus inputted and adds an integrated value to a comparator 42. The comparator 42 compares the integrated value thus added by the integrating circuit 40 with a predetermined value corresponding to the proper exposure, and detects whether the integrated circuit has reached a predetermined value or not. When a control circuit 44 detects that the integrated circuit has reached the predetermined value corresponding to the proper exposure in response to a signal from the comparator 42, the control circuit 44 outputs a control signal to the luminescence circuit 46, to thereby stop the luminescence from the stroboscope 48. With this arrangement, the light of the subject, which has the proper exposure falls into the light receiving plane 26 of the solid state image sensing device.

In the above-described embodiment, a prism has been used as the beam splitter 20, however, the present invention should not necessarily be limited to this, and a quick return mirror for use in a monocular reflex camera can be used for bifurcating the light into two directions.

As has been described hereinabove, in the electronic still camera according to the present invention, at least a part of the light reflected by the subject is diverged by the beam splitter provided on the optical axis of the taking lens, and further diverged by the half mirror. The reflected light and the transmitted light are led to the dimming sensor, respectively, and led to the AE sensor through the focusing lens, so that the dimming sensor can be provided in the position other than the vicinity of the taking shutter and the TTL direct dimming can be conducted. Furthermore, by changing the reflectance and the transmittance of the half mirror, the differences in sensitivity between the dimming sensor and the AE sensor can be compensated, and further, by use of the focusing lens, the difference in dimensions of the image on the light receiving portions between the dimming sensor and the AE sensor can be controlled.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. An electronic still camera, which fails to use silver salt film, having an auto-strobe device and an automatic exposure control device comprising:
   a taking lens for focusing a straight light from a subject at a light receiving plane of a solid state image sensing device;
   transducing means for photo-electrically transducing said light from said subject by said solid state image sensing device to obtain image signals;
   a beam splitter provided on the optical axis of said taking lens, for diverging at least a part of said light from said subject which passes through said taking lens; and
   a half mirror for further diverging and leading the light diverged by said beam splitter to a dimming sensor of said auto-strobe device and further leading the light diverged by said beam splitter to an AE sensor of said automatic exposure control device via a focusing lens, wherein said half mirror has a transmittance corresponding to the sensitivity of said dimming sensor and a reflectance corresponding to the sensitivity of said AE sensor.

2. The electronic still camera as set forth in claim 1, wherein a neutral density filter for correcting the dispersion of said dimming sensor is provided between said half mirror and said dimming sensor.

3. An electronic still camera, which fails to use silver salt film, having an auto-strobe device and an automatic exposure control device comprising:
   a taking lens for focusing a light from a subject at a light receiving plane of a solid state image sensing device;
   transducing means for photo-electrically transducing said light from said subject by said solid state image sensing device to obtain image signals;
   a beam splitter provided on the optical axis of said taking lens, for diverging at least a part of said light from said subject which passes through said taking lens; and
   a half mirror for further diverging and leading the light diverged by said beam splitter to a dimming sensor of said auto-strobe device and further leading the light diverged by said beam splitter to an AE sensor of said automatic exposure control device via a focusing lens, wherein said AE sensor comprises an averaged light measuring receiving portion thereof for conducting averaged light measuring and a spot metering light receiving portion for conducting spot metering, and said dimming sensor conducts center-weighted metering.

4. A method for TTL direct dimming in an electronic still camera, which fails to use silver salt film, having an autostrobe device and an automatic exposure control device, comprising the steps of:
   (a) focusing a light from a subject at a light receiving plane of a solid state sensing device by a taking lens;
   (b) photo-electrically transducing said light from said subject by said solid state image sensing device to obtain image signals;
   (c) diverging at least a part of said light from said subject which passes through said taking lens by a beam splitter provided on the optical axis of said taking lens and outputting the light diverged by said beam splitter;
   (d) diverging and leading the light diverged by said beam splitter at said step (c) by a half mirror to a dimming sensor of the auto-strobe device; wherein said half mirror for diverging and leading the light at said step (d) has a transmittance corresponding to the sensitivity of said dimming sensor and a reflectance corresponding to the sensitivity of said AE sensor; and (e) leading the light diverged by said beam splitter, which is outputted at said step (c), to an AE sensor of the automatic exposure control device via a focusing lens.

5. The method for TTL direct dimming as set forth in claim 4, further comprising the step of correcting the dispersion of said dimming sensor by a neutral density filter provided between said half mirror and said dimming sensor.

6. A method for TTL direct dimming in an electronic still camera, which fails to use silver salt film, having an auto-strobe device and an automatic exposure control device, comprising the steps of:

(a) focusing a light from a subject at a light receiving plane of a solid state sensing device by a taking lens;

(b) photo-electrically transducing said light from said subject by said solid state image sensing device to obtain image signals;

(c) diverging at least a part of said light from said subject which passes through said taking lens by a beam splitter provided on the optical axis of said taking lens and outputting the light diverged by said beam splitter;

(d) diverging and leading the light diverged by said beam splitter at said step (c) by a half mirror to a dimming sensor of the auto-strobe device;

(e) leading the light diverged by said beam splitter, which is outputted at said step (c), to an AE sensor of the automatic exposure control device via a focusing lens;

(f) conducting averaged light measuring with an averaged light measuring receiving portion of said AE sensor;

(g) conducting spot metering with a spot metering light receiving portion of said AE sensor; and (h) conducting center-weighted metering with said dimming sensor.

* * * * *